INVENTOR.
Walter F. Lynsavage

2,837,873
METHOD OF MAKING DENSE-FACE, CELLULAR VITREOUS BODIES

Walter F. Lynsavage, Port Allegany, Pa., assignor to Pittsburgh Corning Corporation, Pittsburgh, Pa., a corporation of Pennsylvania Application March 31, 1955, Serial No. 498,390

6 Claims. (Cl. 49—77)

This invention relates to a method of making a cellular body having a unitary cellular, relatively dense facing layer and a cellular relatively lightweight backing.

An object of the invention is to provide a cellular vitreous insulating material in which the amount of cellulation and the cell structure differ in different strata of the cellular body.

Another object of the invention is to provide a cellular vitreous insulating material which has a hard and dense surface stratum and a highly thermal insulating backing stratum.

Another object is to provide a cellular vitreous insulating material which has increased impact strength and durability on at least one of its surfaces.

A further object is to provide a cellular vitreous insulating material which has a highly durable light-colored surface having small noncommunicating cells.

In the accompanying drawing, which illustrates two embodiments of my invention,

Figure 1:
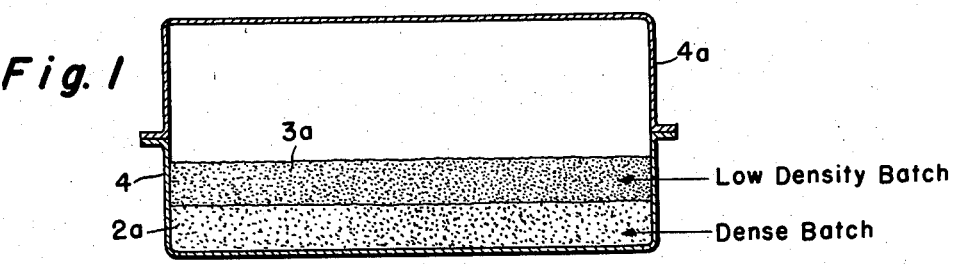
Figure 1 is a transverse section through a mold showing two cellulating batches in layers in the mold before cellulation.

Cellular vitreous materials, particularly cellular glass, are well known and widely used as building materials. They are especially useful where thermal insulation is desirable. Several methods are known for producing cellular glass. In one such method, a glass with a high sulphate content is prepared, the glass is then pulverized and mixed with a reducing agent. The batch is then heated to a temperature sufficient to sinter and soften the glass and to cause the reducing agent to react with the sulphate in the glass, thereby liberating gases which cause cellulation of the body. In another method of producing cellular glass, a glass is prepared with includes a metal oxide. The glass is then pulverized and mixed with a reducing agent which, upon subsequent heating, reacts with the oxide in the glass to produce a gas which cellulates the body. Another method of producing cellular glass consists in mixing pulverized glass and a substance which decomposes when heated and thereafter heating the batch to cause decomposition of the substance, thereby liberating gas which causes cellulation of the body.

The cellular product produced by the foregoing methods is light in weight, having a density of about 8 to 10 pounds per cubic foot. This low density is a result of the multitudinous bubbles or cells created within the product and the fact that the cell walls separating the individual cells are exceedingly thin. The low density and thin cell walls impart to the product a high thermal insulating value which makes the product commercially desirable. Unfortunately, the low density and thin cell walls which impart to the material its low thermal conductivity are not compatible with physical strength and surface hardness. Because the product necessarily lacks these physical properties, it has been found necessary to provide it with some sort of hard surface covering to protect it from impact damage. Many such coating methods are used to provide this protection but all of them involve additional labor and material and thus increase its cost.

One method directed toward overcoming the necessity of applying a protective covering to a previously manufactured cellular body is disclosed in Haux Patent No. 2,310,432. In the process described in that patent, the cellular vitreous product is provided with a dense face which is an integral part of the product. The process described consists in mixing different amounts of the same cellulating agent, such as calcium carbonate, with separate glass batches. The two mixtures thus prepared are superposed in separate layers in a mold and heated to a temperature sufficient to sinter and soften the glass, to cellulate it by decomposing the calcium carbonate and liberating gas, and to unit the two layers. In the layer containing the larger amount of cellulating agent, there is a great deal of cellulation thereby resulting in a low density, high thermal insulating product. In the layer with the smaller amount of cellulating agent, there is a correspondingly lesser amount of cellulation, resulting in a high density product.

The product and method of the Haux patent are objectionable in several respects. Of the several cellulating agents mentioned in the patent, only carbon produces a cellular material that has cells which are of such size and structure as to produce a product with a commercially acceptable thermal insulating value. The preferred cellulating agent of the patent is calcium carbonate. However, when calcium carbonate is used as the cellulating agent, the cellular product has a certain percentage of open cells and because of the open cell structure, its thermal insulating value is not as high as desired and the material is not impervious to moisture.

A great deal of difficulty is encountered in carrying out the method disclosed in the Haux Patent, irrespective of the particular cellulating agent employed. These difficulties arise from the inherent phenomena of sintering and cellulating. During sintering of the vitreous mass, there is a shrinking tendency which causes cracks to develop. Upon further heating, cellulation occurs but in an objectionable manner since the batch which is to form the lightweight backing, which batch has a greater cellulating power because of the greater amount of cellulating agent which it contains, cellulates at a much more rapid rate than the batch which is to form the dense facing. The result of this more rapid cellulating is that the low density-forming batch tends to cellulate into and through the unhealed sinter cracks of the high density-forming batch. In many cases, the low density material, because of its higher cellulating rate, penetrates all the way through the dense facing stratum. When this happens, the impact resistance of the surface is impaired or destroyed.

In accordance with my invention, penetration of the less dense stratum into the dense stratum is prevented by realizing and making use of the fact that the rate and quality of cellulation are dependent not only upon the amount of cellulating agent but also upon the kind of cellulating agent used and the temperature at which and time during which cellulation takes place. That is, cellulation is a time-temperature reaction which requires not only a relatively high temperature but also an interval of time for the reaction to take place. As the temperature is increased, the time necessary for the reaction which liberates gases from the cellulating agent decreases.

In my method, the cellulating agent which is used in the batch which forms the dense facing is different from the cellulating agent which is used in the batch which forms the lightweight backing of the composite cellulated body. The cellulating agent used to form the dense facing layer is of such character that it begins to react to liberate gas at a somewhat lower temperature than the cellulating agent in the layer which is to form the lightweight backing. The amounts of cellulating agents employed are such that one batch when cellulated is of the density desired for the less dense or lightweight backing and another batch when cellulated is of the density desired for the dense facing.

In heating the superposed layers to cause them to cellulate, the layers pass through a sintering temperature at which there is a shrinkage of the layers and the development of cracks. The layers thereafter reach a temperature at which the cellulating agent in the dense facing layer liberates gas and bloats the facing layer and heals any shrinkage cracks which have been formed during sintering. At a somewhat higher temperature, the cellulating agent in the layer which is to form the lightweight backing reacts to liberate gas and cause cellulation. However, by the time that the less dense portion, with its much greater cellulating power, reacts and its movement and bloating takes place, the dense portion has cellulated sufficiently to heal the sinter cracks and to resist penetration by the less dense portion. In other words, the somewhat earlier but less emount of cellulation in the dense portion is able to balance the later and greater cellulation in the less dense portion of the body. In this manner, the less dense material is prevented from penetrating and thus destroying the properties of the dense stratum.

In practicing the present invention, vitreous material, for example, glass, is formed in any desired manner as, for instance, by melting the glass batch materials in a conventional gas fired glass tank, drawing the glass in a continuous tube and allowing it to solidify. If more cellulating power than is provided by sulphates retained in the glass is desired, about 1% of antimony oxide can be added to the glass batch before melting. A lime-soda-silica glass is illustrative of the type that can be used.

Figure 2:
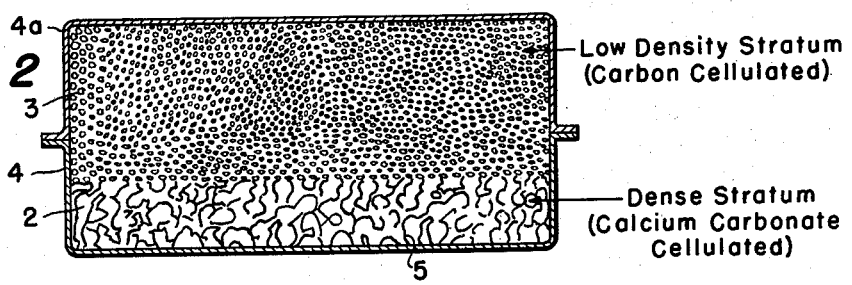
Figure 2 is a similar section showing a composite cellulated block according to one embodiment of my invention.

Example 1 illustrates the method of producing the cellular product shown in Figure 2 in which reference numeral 2 designates a cellular relatively dense facing and reference numeral 3 designates a cellular relatively lightweight backing.

*Example 1*

A cellulating batch 2a to produce the high density material 2 is prepared by grinding together in a ball mill the glass and about 0.2% by weight of calcium carbonate until an average particle size of from 3 to 5 microns is achieved.

A cellulating batch 3a to produce the lightweight material 3 is prepared by grinding together in a ball mill the glass and from 0.1 to 0.7% by weight of carbon until an average particle size of from 3 to 5 microns is achieved.

It has been found preferable to cellulate the product in closed molds but the material could be produced in a continuous ribbon and subsequently divided into lengths suitable for shipment and use. When molds are used, a layer about ¾" thick of the previously prepared dense-face-forming cellulating batch 2a is placed in the bottom of a mold 4 and carefully leveled. It is important that the batch be kept at an even depth so that the dense layer in the finished product will be of constant thickness. Over this is placed a layer of from ¾" to 1" thick of the lightweight-backing-forming cellulating batch 3a. The layer 3a can vary considerably in thickness depending upon how much insulating material is desired. In the finished cellulated product, the lightweight cellular backing 3 is generally from 2 to 4 times as thick as the dense face layer 2. In some cases, it has been found advantageous to place a glass fiber mat between the two layers 3a and 2a of the batch. The presence of the mat seems to act as a barrier and thus reduces the tendency for the low density batch to penetrate the high density batch during cellulation.

After both cellulating batches have been loaded in the mold, a cover 4a is placed on it which allows sufficient space for the batches to bloat and cellulate.

The covered molds containing the superposed layers are then charged into a continuous gas fired furnace which has a heating cycle of 60 to 90 minutes and in which the molds and contents reach a peak temperature between 1650° F. and 1700° F. The glass sinters at about 1450° F. The material shrinks and develops cracks during sintering. At a temperature of about 1550° F., the calcium carbonate decomposes and produces sufficient gas and bloating in the dense stratum 2 to heal the sinter cracks that are present. The cellulation in the low density stratum 3 is effectively accomplished when the mold has progressed through the furnace to where the temperature is about 1600° F. to 1700° F. This highly cellulated stratum 3 is prevented from penetrating the dense layer 2 because the latter has already cellulated sufficiently to offer resistance to penetration.

The cellulated body is then stripped from the mold and immediately placed in an annealing lehr and cooled over a period of about 10 to 15 hours, depending upon the thickness of the cellulated product. After annealing, the cellulated product is finished by grinding all six sides to provide smooth surfaces and a rectangular product having incorporated as an integral part the cellulated, relatively dense, hard-faced layer 2. The apparent density of the finished product is about 15 pounnds per cubic foot. In following this method, at least some of the cells 5 in the dense layer 2 are open and are somewhat larger than the optimum for appearance and ease of grinding.

Figure 3:
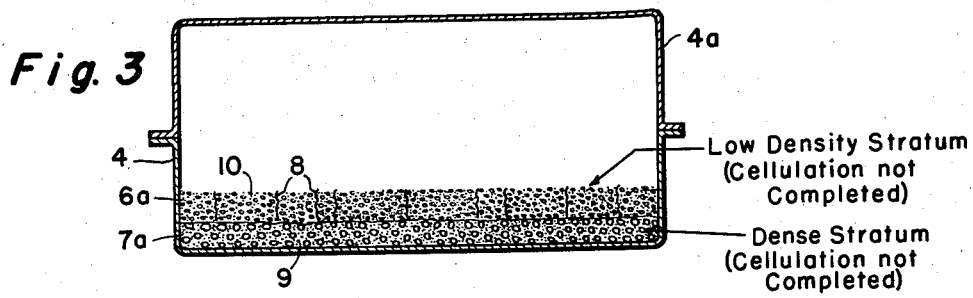
Figure 3 is a similar section showing a composite cellulated block according to another embodiment of my invention but before cellulation is completed.
Figure 4:
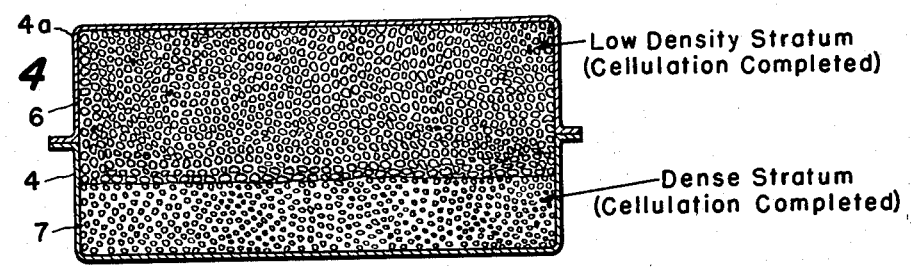
Figure 4 is a similar section showing a composite cellulated block according to the embodiment shown in Figure 3 but after cellulation is completed.

Figures 3 and 4 illustrate the preferred embodiment of the invention. Figure 3 shows the layers after they have been sintered but before substantial cellulation has taken place. Figure 4 shows the layers after cellulation has been completed. In Figure 4, the lower layer 7 has small closed cells, is resistant to penetration by moisture and its surface can be readily ground. This structure is produced by employing two cellulating agents in the batch which is to form the dense-face, lower layer 7, one of the cellulating agents liberating gas at a relatively low temperature and the other at a relatively high temperature. Example 2 illustrates the method of manufacturing the cellular product shown in Figure 4.

*Example 2*

As in Example 1, a cellulating batch 6a to produce the low density backing 6 shown in Figure 4 is prepared by grinding together in a ball mill the glass and from 0.1 to 0.7% by weight of carbon until an average particle size of from 3 to 5 microns is achieved.

A cellulating batch 7a to produce the high density material 7 is prepared by grinding together in a ball mill the glass and about 0.1% by weight of calcium carbonate and about 0.1% by weight of finely ground silicon carbide until an average particle size of about 3 to 5 microns is achieved. The silicon carbide should be previously ground to a particle size of about 1 to 2 microns.

The two cellulating batches 6a and 7a are superposed in molds and fired in the same manner as in Example 1. The glass sinters at about 1450° F. and during sintering the material shrinks and develops cracks 8. At about 1550° F., the relatively small amount of calcium carbonate decomposes, thereby liberating gas and bloating the layer 7a only enough to close the sinter cracks in this layer, thereby producing a hard material of very high density. At this temperature, neither the carbon used as the cellulating agent in the layer 6a nor the silicon carbide used as the cellulating agent in the layer 7a has reacted to a substantial extent to liberate gases. Thus, at this stage of the process, the layer 7a contains particles 9 of unreacted silicon carbide in the walls of the cells produced by decomposing the calcium carbonate and the layer 6a contains particles 10 of unreacted carbon. As the temperature is further increased, the carbon particles 10 and the silicon carbide particles 9 react with the glass and liberate gases. These reactions are effectively completed when a temperature of about 1600° F. to 1700° F. is reached. The reaction of the silicon carbide with the glass forms many fine closed cells within the dense layer. The product is then stripped from the molds and annealed and finished by grinding in the manner previously described. The dense layer 7, resulting from this process, has fine noncommunicating cells and thin cell walls which can be readily ground to a smooth surface having the desired resistance to impact and to penetration by moisture.

The present invention is applicable to the use of other vitreous materials than glass and other combinations of cellulating agents. For example, any alkaline earth carbonate which liberates gas upon heating to a temperature higher than the sintering and softening temperature of the vitreous material with which it is mixed can be used in place of calcium carbonate as a cellulating agent for making the dense facing layer. In the process of Example 1, the carbon used as the cellulating agent in layer 3 can be replaced partially or totally by silicon carbide or any metal carbide or nitride which liberates gas at a higher temperature than that at which the calcium carbonate or other cellulating agent used in layer 2 liberates gas. In the method of Example 2, the silicon carbide 8 can be replaced partially or totally by carbon or by any metal carbide or nitride which reacts to liberate gas at a temperature which is higher than the temperature at which calcium carbonate or other low temperature cellulating agent decomposes or releases gas.

The invention is not limited to the disclosed embodiments but may be otherwise embodied or practiced within the scope of the following claims.

I claim:

1. A method of making a cellular body having a unitary cellular, relatively dense facing layer and a cellular relatively lightweight backing, which comprises mixing pulverized vitreous material and an amount of a first cellulating agent to provide a first batch adapted when heated to cellulating temperature to form said relatively dense facing layer, mixing pulverized vitreous material and an amount of a second cellulating agent to provide a second batch adapted when heated to cellulating temperature to form said relatively lightweight backing, each of said cellulating agents having a temperature of reaction to liberate gas which is above the temperature of sintering and softening of the vitreous material with which it is mixed, the temperature of reaction of said first cellulating agent to liberate gas being lower than that of said second cellulating agent, superposing said separate batches in layers and heating the superposed layers to a temperature sufficient to sinter and cellulate them into a unitary body.

2. A method according to claim 1, wherein said first cellulating agent is an alkaline earth carbonate and wherein said second cellulating agent is a member of the group consisting of carbon, metal carbides and nitrides.

3. A method according to claim 1, wherein said first cellulating agent is calcium carbonate and wherein said second celluating agent is carbon.

4. A method of making a cellular body having a unitary cellular, relatively dense facing layer and a cellular relatively lightweight backing, which comprises mixing pulverized vitreous material, a cellulating agent having a temperature of reaction to liberate gas which is relatively low and a cellulating agent having a temperature of reaction to liberate gas which is relatively high, said cellulating agents being in amounts to provide a first batch adapted when heated to cellulating temperature to form said relatively dense facing layer, mixing pulverized vitreous material and an amount of a cellulating agent to provide a second batch adapted when heated to cellulating temperature to form said relatively lightweight backing, the cellulating agent in said second batch having a temperature of reaction to liberate gas which is higher than that of said cellulating agent in said first batch which has said relatively low temperature of reaction, each of said cellulating agents having a temperature of reaction to liberate gas which is above the temperature of sintering and softening of the vitreous material with which it is mixed, superposing said separate batches in layers and heating the superposed layers to a temperature sufficient to sinter and cellulate them into a unitary body.

5. A method of making a cellular body having a unitary cellular, relatively dense facing layer and a cellular relatively lightweight backing, which comprises mixing pulverized vitreous material with an amount of calcium carbonate and an amount of a member of the group consisting of carbon, metal carbide and metal nitride to provide a first batch adapted when heated to cellulating temperature to form said relatively dense facing layer, mixing pulverized vitreous material and an amount of a member of the group consisting of carbon, metal carbide and metal nitride to provide a second batch adapted when heated to cellulating temperature to form said relatively lightweight backing, each of said cellulating agents having a temperature of reaction to liberate gas which is above the temperature of sintering and softening of the vitreous material with which it is mixed, superposing said separate batches in layers and heating the superposed layers to a temperature sufficient to sinter and cellulate them into a unitary body.

6. A method of making a cellular body having a unitary cellular, relatively dense facing layer and a cellular relatively lightweight backing, which comprises mixing pulverized vitreous material with an amount of calcium carbonate and an amount of silicon carbide to provide a first batch adapted when heated to cellulating temperature to form said relatively dense facing layer, mixing pulverized vitreous material and an amount of carbon to provide a second batch adapted when heated to cellulating temperature to form said relatively lightweight backing, each of said cellulating agents having a temperature of reaction to liberate gas which is above the temperature of sintering and softening of the vitreous material with which it is mixed, superposing said separate batches in layers and heating the superposed layers to a temperature sufficient to sinter and cellulate them into a unitary body.

References Cited in the file of this patent

UNITED STATES PATENTS

| | | |
|---|---|---|
| 1,823,356 | Frink | Sept. 15, 1931 |
| 2,123,536 | Long | July 12, 1938 |
| 2,233,608 | Haux et al. | Mar. 4, 1941 |
| 2,310,432 | Haux | Feb. 9, 1943 |
| 2,337,672 | Long | Dec. 28, 1943 |
| 2,544,954 | Ford | Mar. 13, 1951 |

UNITED STATES PATENT OFFICE
CERTIFICATE OF CORRECTION

Patent No. 2,837,873                      June 10, 1958

Walter F. Lynsavage

It is hereby certified that error appears in the printed specification of the above numbered patent requiring correction and that the said Letters Patent should read as corrected below.

Column 1, line 58, for "with" read --which--; column 2, line 26, for "unit" read --unite--; line 68, for "quality" read --quantity--; column 3 line 33, for "emount" read --amount--; column 4, line 37, for "pounnds" read --pounds--.

Signed and sealed this 15th day of July 1958.

(SEAL)
Attest:

KARL H. AXLINE                            ROBERT C. WATSON

Attesting Officer                          Commissioner of Patents